United States Patent
Murayama

(10) Patent No.: US 11,946,779 B2
(45) Date of Patent: Apr. 2, 2024

(54) POSITION DETECTION APPARATUS
(71) Applicant: DMG MORI CO., LTD., Nara (JP)
(72) Inventor: Chihiro Murayama, Kanagawa (JP)
(73) Assignee: DMG MORI CO., LTD., Nara (JP)
( * ) Notice: Subject to any disclaimer, the term of this patent is extended or adjusted under 35 U.S.C. 154(b) by 0 days.
(21) Appl. No.: 17/225,688
(22) Filed: Apr. 8, 2021
(65) Prior Publication Data
US 2021/0318145 A1 Oct. 14, 2021
(30) Foreign Application Priority Data
Apr. 9, 2020 (JP) ................................ 2020-070606
(51) Int. Cl.
*G01D 5/249* (2006.01)
*G01D 5/245* (2006.01)
(52) U.S. Cl.
CPC ......... *G01D 5/2455* (2013.01); *G01D 5/2451* (2013.01); *G01D 5/2492* (2013.01); *G01D 5/2497* (2013.01)
(58) Field of Classification Search
CPC .... G01D 5/2454; G01D 5/2455; G01D 5/249; G01D 5/2492; G01D 5/2497; G01D 5/34776; G01D 5/34792
See application file for complete search history.

(56) References Cited

U.S. PATENT DOCUMENTS

| | | | | |
|---|---|---|---|---|
| 5,187,546 A | * | 2/1993 | Johnston | G01D 5/2495 356/399 |
| 6,327,791 B1 | * | 12/2001 | Norcross | F15B 15/2876 33/710 |
| 6,760,682 B1 | * | 7/2004 | Schwabe | H03M 1/0685 324/207.17 |
| 2003/0145479 A1 | * | 8/2003 | Mayer | G01D 5/24461 33/707 |

(Continued)

FOREIGN PATENT DOCUMENTS

JP 01-079619 A 3/1989
JP H07-229762 A 8/1995
(Continued)

OTHER PUBLICATIONS

Espacenet English abstract of JP 01-079619 A.
(Continued)

*Primary Examiner* — Steven L Yeninas
(74) *Attorney, Agent, or Firm* — DiPerna Law Firm, P.C.

(57) ABSTRACT

This invention provides a position detection apparatus that improves the position detection accuracy. A position detection apparatus includes an absolute track in which when N is an integer of not less than 2, a recording binary sequence created based on a position detection binary sequence in which identical sequences do not exist no matter which N continuous terms are extracted is recorded, and an absolute sensor unit that reads the recording binary sequence from the absolute track, wherein a plurality of terms included in the recording binary sequence consist of two binary values, and when the two binary values are assumed to be 1 and 0, the recording binary sequence is a sequence obtained by replacing one of two values included in the position detection binary sequence with 10 and the other value in the position detection binary sequence with 01.

6 Claims, 10 Drawing Sheets

(56) References Cited

U.S. PATENT DOCUMENTS

| | | | | |
|---|---|---|---|---|
| 2005/0072016 A1* | 4/2005 | Strasser | ............ | H03M 1/0685 |
| | | | | 341/11 |
| 2006/0071818 A1* | 4/2006 | Muller | ................ | G01D 5/2497 |
| | | | | 341/15 |
| 2012/0026321 A1* | 2/2012 | Hasler | ................ | G01D 5/2449 |
| | | | | 348/135 |
| 2015/0377654 A1* | 12/2015 | Agrawal | ............ | G01D 5/2455 |
| | | | | 702/150 |

FOREIGN PATENT DOCUMENTS

| | | |
|---|---|---|
| JP | 2001-296145 A | 10/2001 |
| JP | 2007-218907 A | 8/2007 |
| WO | 2018/163424 A1 | 9/2018 |

OTHER PUBLICATIONS

Office Action dated Dec. 5, 2023 in connection with Japanese Patent Application No. 2020-070606 and English machine translation thereof, 8 pages.

\* cited by examiner

POSITION DETECTION APPARATUS

This application is based upon and claims the benefit of priority from Japanese patent application No. JP2020-070606, filed on Apr. 9, 2020, the disclosure of which is incorporated herein in its entirety by reference.

BACKGROUND OF THE INVENTION

Field of the Invention

The present invention relates to a position detection apparatus.

Description of the Related Art

In the above technical field, patent literature 1 discloses a position detection apparatus that detects a position by reading, by a magnetic sensor, a magnetic signal recorded on a magnetic medium based on a non-repeating code.

[Patent Literature 1] Japanese Patent Laid-Open No. 01-079619

SUMMARY OF THE INVENTION

According to the technique described in the above literature, however, the non-repeating code may include a portion where a plurality of "1"s repeatedly appear corresponding to the length of a detection head, or a portion where "0" and "1" alternately appear. Hence, in a method of making one term of non-repeating code correspond to magnetic recording in one direction, a portion where the magnetization inversion interval is very long and a portion where the magnetization inversion interval is short appear.

In this case, waveform interference for the magnetic signal generated from an absolute track is conspicuous. For this reason, there is a fear about the influence of the magnetic signal under the waveform interference on the position detection accuracy.

One example aspect of the present invention provides a position detection apparatus comprising:

an absolute track in which when N is an integer of not less than 2, a recording binary sequence created based on a position detection binary sequence in which identical sequences do not exist no matter which N continuous terms are extracted is recorded; and an absolute sensor unit that reads the recording binary sequence from the absolute track, wherein a plurality of terms included in the recording binary sequence consist of two binary values, and when the two binary values are assumed to be 1 and 0, the recording binary sequence is a sequence obtained by replacing one of two values included in the position detection binary sequence with two values as 10 and the other value in the position detection binary sequence with two values as 01.

According to the present invention, it is possible to provide a position detection apparatus capable of ensuring a sufficient magnetic position detection accuracy.

DESCRIPTION OF THE EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

Figure 1A:
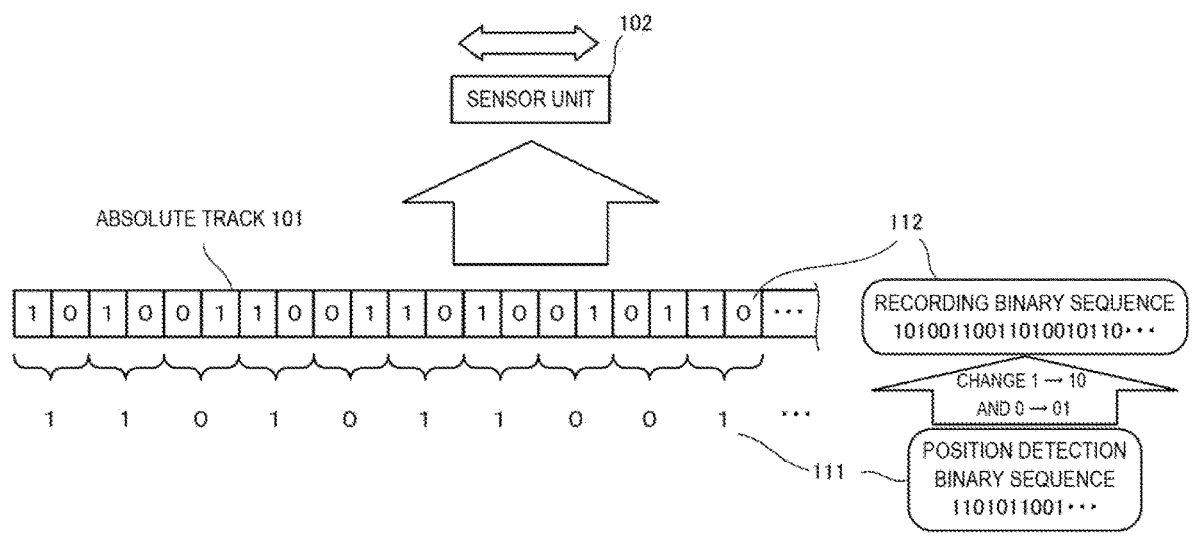
FIG. 1A is a block diagram showing the arrangement of a position detection apparatus according to the first example embodiment.

A position detection apparatus 100 according to the first example embodiment will be described with reference to FIGS. 1A and 1B. As shown in FIG. 1A, the position detection apparatus 100 includes an absolute track 101 and a sensor unit 102.

In the absolute track 101, a recording binary sequence 112 created based on a position detection binary sequence 111 in which identical sequences do not exist no matter which N continuous terms (N is an integer of 2 or more) are extracted is recorded. FIG. 1A shows an example in which N=4.

The sensor unit 102 reads the recording binary sequence 112 from the absolute track 101 while moving in the left-and-right direction.

Each of a plurality of terms included in the recording binary sequence 112 is formed by one of two values, and the two values are assumed to be 1 and 0. At this time, the recording binary sequence 112 is a sequence obtained by replacing one of two values included in the position detection binary sequence 111 with 10 and the other value in the position detection binary sequence with 01.

According to the above-described arrangement, since three or more 1s or 0s never continue in the recorded binary sequence, it is possible to provide a position detection apparatus capable of detecting a position using a magnetic signal affected little by waveform interference.

Figure 1B:
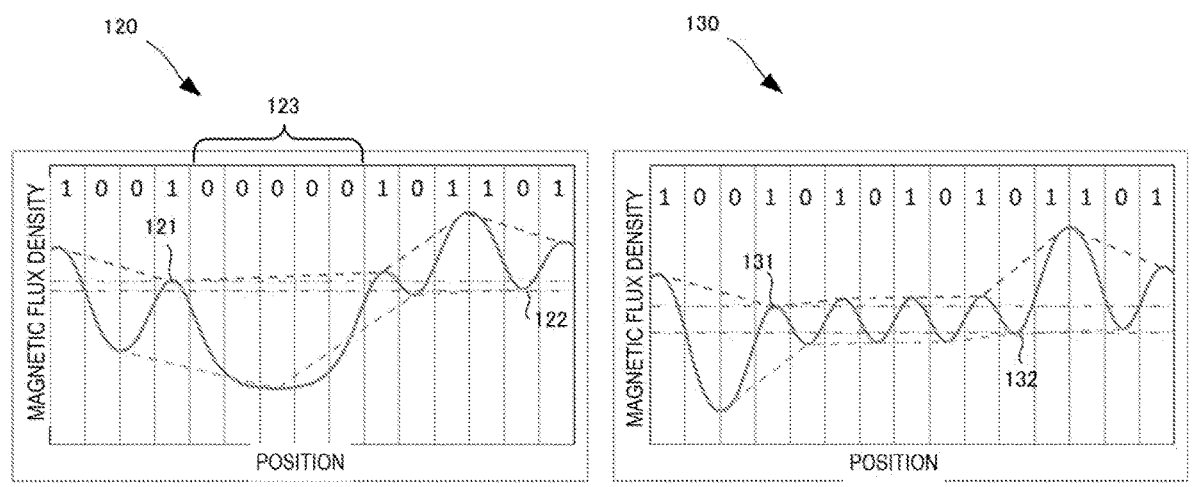
FIG. 1B is a view for explaining the effect of the position detection apparatus according to the first example embodiment.

FIG. 1B is a view for explaining the effect of this example embodiment. A graph 120 is an example of a graph representing a change of a magnetic flux depending on a position in a conventional technique. A graph 130 is an example of a graph representing a change of a magnetic flux depending on a position in this example embodiment.

In the graph 120, large waveform interference occurs in a portion 123 where magnetization occurs continuously three or more times in the same direction (that is, 0 or 1 continues). For this reason, the difference between a maximum value 121 in a minimal portion and a minimum value 122 in a maximal portion of the waveform is small, and it is difficult to discriminate a value only by the magnetic flux at that position.

On the other hand, in the example embodiment shown in the graph 130, since magnetization occurs continuously in the same direction only two times at maximum in any portion, a maximum value 131 in a minimal portion and a minimum value 132 in a maximal portion of the waveform are apart, and discrimination calf easily be performed. That is, the position detection accuracy becomes high.

Second Example Embodiment

Figure 2:
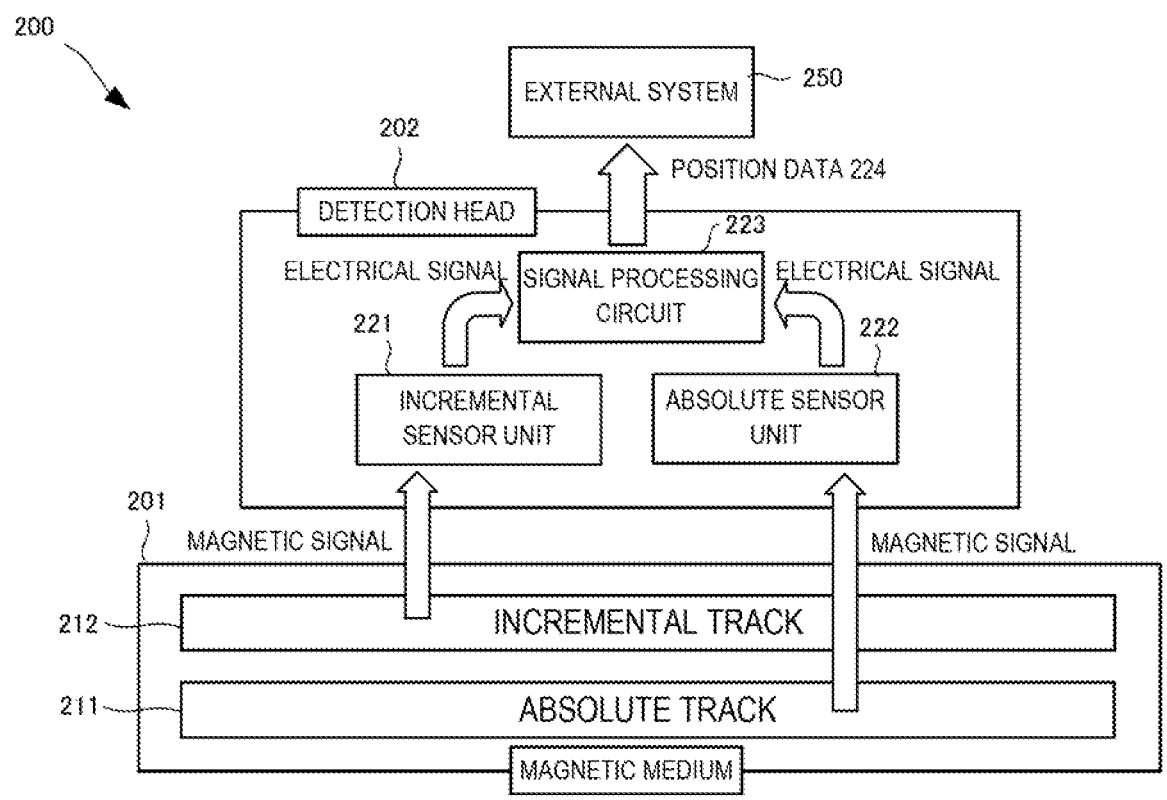
FIG. 2 is a block diagram for explaining the arrangement of a position detection apparatus according to the second example embodiment.

A position detection apparatus 200 according to the second example embodiment will be described next with reference to FIG. 2. As shown in FIG. 2, the position detection apparatus 200 includes a magnetic medium 201 including at least one absolute track 211 and at least one incremental track 212, and a detection head 202 serving as a sensor unit. A non-repeating code is recorded in the absolute track 211, and a repeating code is recorded in the incremental track 212.

In the magnetic medium 201, a magnetic body is magnetized in each region, thereby performing magnetic recording. The magnetic medium 201 has a long plate shape when it is used as a linear encoder, and has a cylindrical shape or a disc shape when it is used as a rotary encoder. Magnetization is performed in the + direction with respect to a certain axis or in the − direction that is the opposite direction of the + direction. This axis can be in the longitudinal direction or the vertical direction of the magnetic medium 201.

The detection head 202 can move relative to the magnetic medium 201. The detection head 202 is a magnetic encoder including an incremental sensor unit 221 and an absolute sensor unit 222, each of which serves as a magnetic detector that converts a magnetic signal into an electrical signal, and a signal processor 223 that converts the electrical signal into position information. The relative positions of the incremental sensor unit 221 and the absolute sensor unit 222 in the detection head 202 do not change.

The incremental sensor unit 221 reads a leakage magnetic field generated from the incremental track 212 and outputs a signal. The incremental sensor unit 221 and the incremental track 212 function as a fore and rear detector that detects fore and rear positions in one period λ of the detection head 202.

The absolute sensor unit 222 reads a leakage magnetic field generated from the absolute track 211 and outputs a signal. The signal processor 223 converts the signal representing the leakage magnetic field into position data 224 representing the position of the detection head 202 on the magnetic medium 201 and outputs the position data to an external system 250.

Figure 3A:
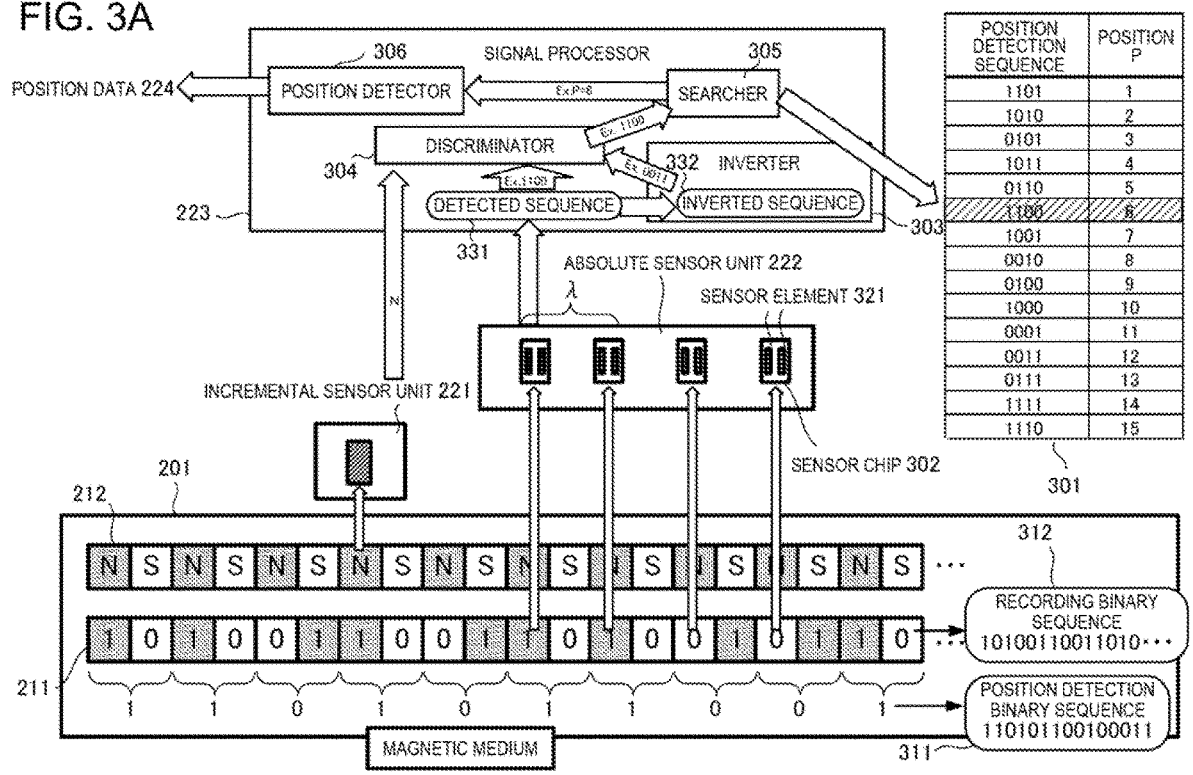
FIG. 3A is a block diagram showing the detailed arrangement of the position detection apparatus according to the second example embodiment.
Figure 3B:
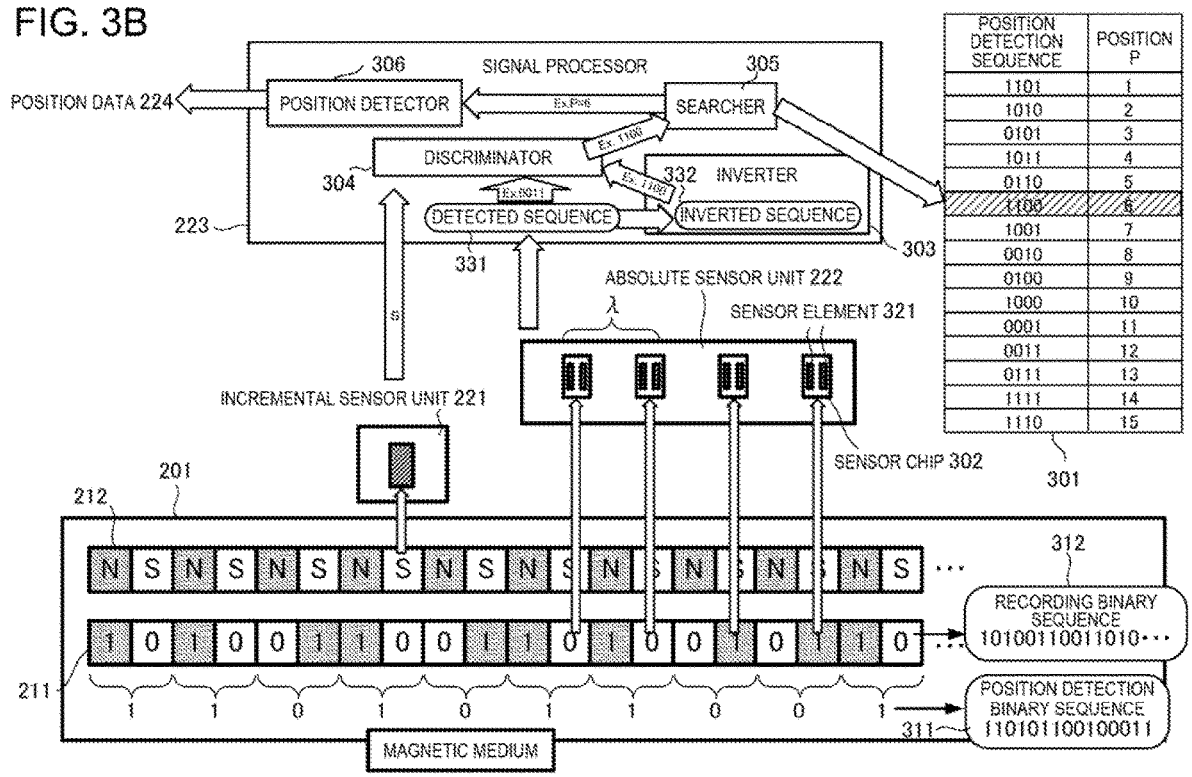
FIG. 3B is a block diagram showing the detailed arrangement of the position detection apparatus according to the second example embodiment.

FIGS. 3A and 3B are views for explaining an example of the positional relationship of magnetic recording between the sensors and the tracks. FIGS. 3A and 3B are different in the position of the absolute sensor unit 222.

In the absolute track 211, a recording binary sequence 312 created based on a position detection binary sequence 311 in which identical sequences never exist in any extracted N continuous terms (N is an integer of 2 or more) is recorded. The absolute sensor unit 222 reads every other term of a sequence of at least N terms from the recording, binary sequence 312 and determines the position of the detected sequence in the entire position detection binary sequence, thereby determining the position of the detection head 202 on the magnetic medium (encoder) 201.

The position detection binary sequence 311 is a sequence generated by an N-bit (N is an integer of 2 or more) LFSR (Linear Feedback Shift Register). The position detection binary sequence 311 is a sequence in which repetitive patterns never exist in any extracted N bits. Here, the position detection binary sequence 311 (for example, 110101100100011) generated by a 4-bit LFSR is shown. In this case, the feedback polynomial is $x^4+x^3+1$, and the period is 15.

A sequence table 301 is a table in which four terms are extracted from the position detection binary sequence and made to correspond to a position P. An example in which the recording binary sequence 312 corresponding to the position detection binary sequence 311 of 10 terms up to 1101011001 is recorded in the absolute track 211 shown in FIG. 3A is shown. One term of the position detection binary sequence 311 is recorded by the direction of inversion of the polarity of the magnet based on a phase encoding method. For example, in FIG. 3I, when the position detection binary sequence 311 is 1, 10 is recorded in the recording binary sequence 312 such that the polarity is inverted from 1 to 0. When the position detection binary sequence 311 is 0, 01 is recorded in the recording binary sequence 312 such that the polarity is inverted from 0 to 1.

In the incremental track 212, magnetic recording is performed by alternately repeating the + direction and the − direction while setting a certain wavelength λ as one period. An incremental signal generated by the incremental recording has the same period λ as the recording binary sequence 312. The incremental sensor unit 221 can detect fore and rear positions in one period by reading the incremental signal. That is, the incremental track 212 and the incremental sensor unit 221 detect a position corresponding to one of the two fore and rear values in the recording binary sequence 312, at which the detection head exists.

The signal processor 223 converts the sequence detected by the absolute sensor unit 222 into the position data 224 based on the correspondence relationship between the recording binary sequence 312 and the position detection binary sequence 311. Then, the position of the detection head is detected based on the position of the sequence in the position detection binary sequence after the conversion, the incremental track 212, and the detection result of the incremental sensor unit 221.

In the absolute track 211, magnetic recording based on the bit string of 0 and 1 generated by the N-bit LFSR of a given tap sequence is performed. As for this recording, recording corresponding to one term of the position detection binary sequence is performed for one incremental period in accordance with the phase encoding method. That is, this method is a method (2-bit method) in which two terms of the recorded sequence of the absolute track 211 correspond to one period (wavelength λ) of the incremental track 212. The absolute sensor unit 222 detects a sequence of at least N terms (N is an integer of 2 or more, and N=4 in FIG. 3A) every other term from the recording binary sequence 312.

If a signal generated from recording of a given region read by the incremental track 212 is higher than a given threshold, 1 is recorded in the region. Conversely, if the signal is lower than the threshold, 0 is recorded in the region. These numerical values form the recording binary sequence 312.

In the example shown in FIGS. 3A and 3B, as for the absolute recording by the phase encoding method, when the position detection binary sequence 311 is 1, the recording binary sequence is 10 from the left, and when the position detection binary sequence 311 is 0, the recording binary sequence is 01. Two terms of the recording binary sequence corresponding to one term of the position detection binary sequence may be the reverse of the above. That is, when the position detection binary sequence 311 is 1, the recording binary sequence may be 01 from the left, and when the position detection binary sequence 311 is 0, the recording binary sequence may be 10. As for a sensor chip 302 of the absolute sensor unit 222 that reads the absolute signal generated from the absolute recording, one set of sensor chips 302 is arranged per λ at equal intervals.

Two sensor elements 321 are arranged in one sensor chip 302 at an interval of λ/4. If the bit length of the LFSR is N, N or more sensor chips 302 are arranged because at least N continuous terms never repeat in the position detection binary sequence. That is, 2N or more sensor elements 321 are arranged. In the example shown in FIGS. 3A and 3B, since the bit length of the LFSR is 4, four sensor chips 302 and eight sensor elements 321 are arranged.

The absolute sensor unit 222 detects the recording binary sequence 312 from the opposing absolute track 211 while moving in the left-and-right direction.

Each of a plurality of terms included in the recording binary sequence 312 is formed by one of two values. When the two values are assumed to be 1 and 0, the recording binary sequence 312 is a sequence (so-called biphase) in which one of two values included in the position detection binary sequence 311 is replaced with 10, and the other value in the position detection binary sequence is replaced with 01. When the sequence is replaced in this way, it is possible to eliminate localization of the magnetic flux caused by continuation of many identical recording signals. When reading, values in the position detection binary sequence are replaced with 1 and 0 in accordance with not the positive/negative of magnetism but the direction of inversion (from positive to negative or from negative to positive).

The signal processor 223 includes an inverter 303, a discriminator 304, a searcher 305, and a position detector 306. The inverter 303 generates an inverted sequence 332 by bit-inverting the detected sequence 331 detected by the absolute sensor unit 222. The discriminator 304 discriminates, based on fore and rear positions detected by the incremental sensor unit 221, which one of the detected sequence 331 and the inverted sequence 332 should be searched for.

The searcher 305 searches the position detection binary sequence 311 for the detected sequence 331 or the inverted sequence 332 discriminated by the discriminator 304.

The position detector 306 detects the position of the absolute sensor unit 222 based on the position of the detected sequence 331 or the inverted sequence 332 found by the searcher 305 in the position detection binary sequence (here, for example, P=6) and the fore and rear positions detected by the incremental sensor unit 221.

Since the positional relationship between the incremental sensor unit 221 and the absolute sensor unit 222 does not vary, it is possible to discriminate, by the incremental signal, at which one of the fore and rear positions in one period of the absolute track 211 all the absolute sensor units 222 are located. If the absolute sensor unit 222 is located in the first half, as shown in FIG. 3A, the detected sequence 331 can directly be estimated as a part of the position detection binary sequence 311. If the absolute sensor unit 222 is located in the second half, as shown in FIG. 3B, it can be estimated that a read inverted sequence in which all terms of the read sequence are bit-inverted is included in the position detection binary sequence. The appearance order P (here, P=6 obtained by searching for the appearance order in the position detection binary sequence is the position of the detected sequence.

Conversely, the absolute sensor unit 222 is arranged such that N or more bits of magnetic signals in the first half or second half can be read. According to the position in one period of the incremental track 212, the detected sequence read by the absolute sensor unit 222 and the inverted sequence thereof can be estimated as non-repeating codes in which one of the sequences is recorded. The relative positions of the magnetic medium 201 and the detection head 202 are determined by decoding the estimated code to position information.

Figure 3C:
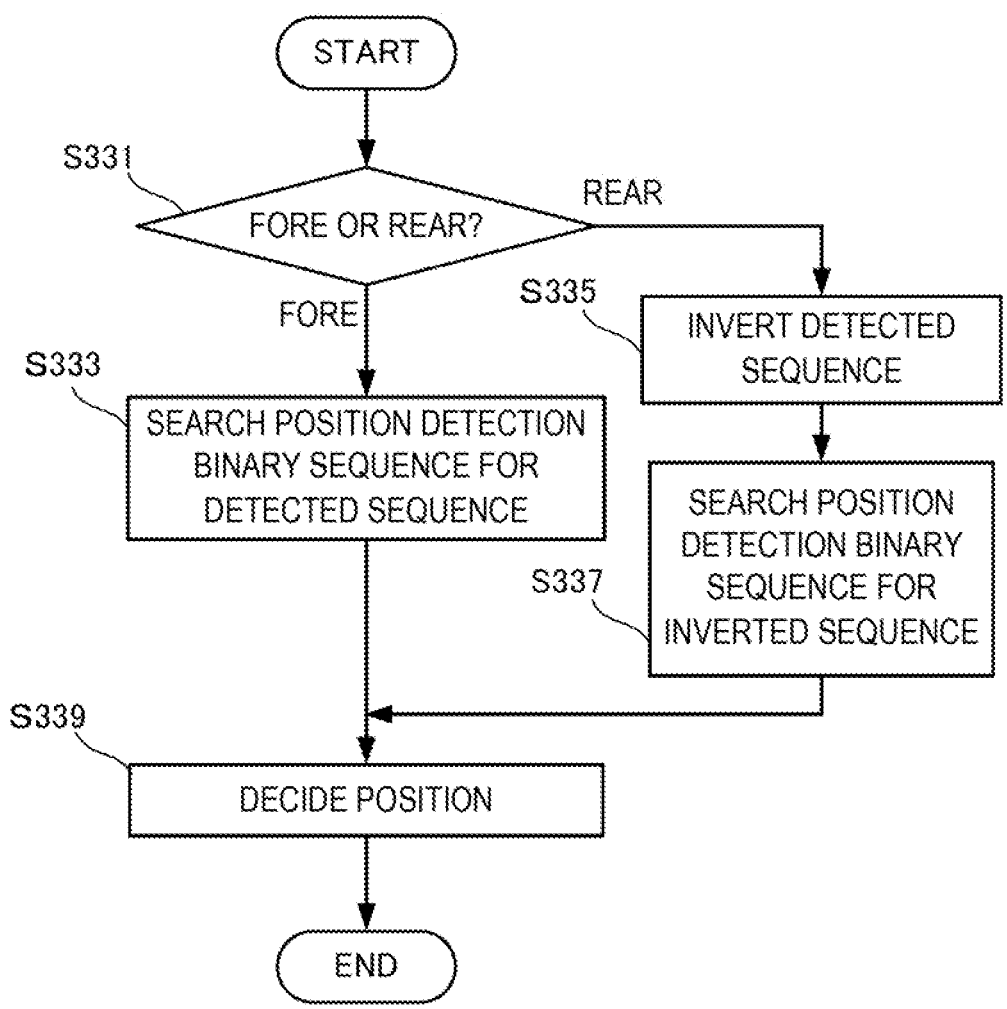
FIG. 3C is a flowchart showing the procedure of processing of the position detection apparatus according to the second example embodiment.

FIG. 3C is a flowchart for explaining the procedure of processing performed by the signal processor 223. In step S331, the discriminator 304 discriminates the fore and rear positions of the absolute sensor unit 222 based on a signal from the incremental sensor unit 221.

Upon determining that the position is the fore position, in step S333, the searcher 305 searches the position detection binary sequence for the detected sequence 331 itself. On the other hand, upon determining that the position is the rear position, in step S335, the inverter 303 inverts the detected sequence, thereby generating the inserted sequence 332. Also, in step S337, the searcher 305 searches the position detection binary sequence for the inverted sequence 332.

Next, in step S339, the position of the absolute sensor unit 222 is detected by combining the position P derived by the search of the searcher 305 and the fore and rear positions detected by the incremental sensor unit 221.

The above-described processing procedure is implemented by executing software by a processor. The procedure may be implemented using an ASIC (Application Specific integrated Circuit) or an FPGA (Field Programmable Gate Array).

Since the position in one period of incremental recording can be known from the incremental signal, the signal processor 223 needs to know the position of a recorded sequence in the magnetic medium 201 when the recorded sequence is read.

Figure 4:
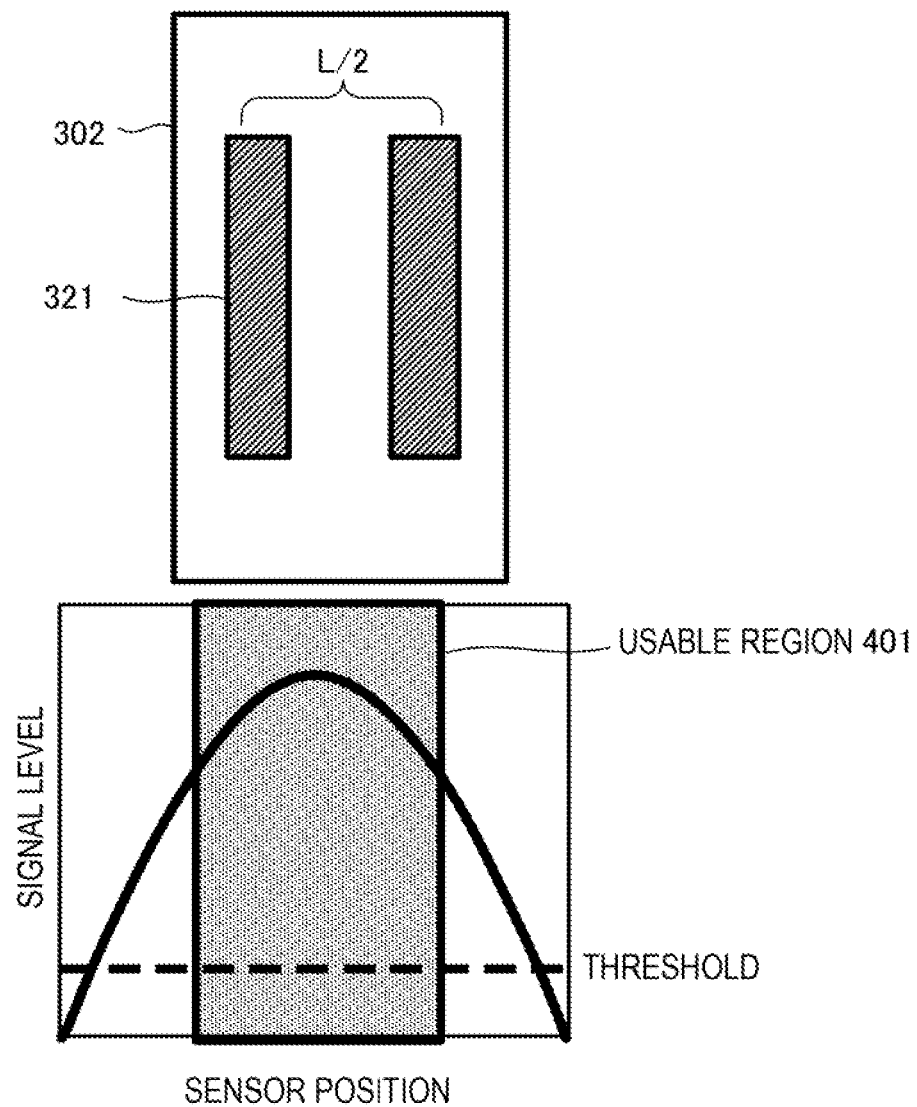
FIG. 4 is a view for explaining the sensor arrangement of the position detection apparatus according to the second example embodiment.

As shown in FIG. 4, since the absolute signal is close to a judgment threshold at an end of a certain region of magnetic recording to 1 or 0, stable read is impossible. Hence, a usable region 401 for stable read is set in the center region (½ width) other than the ends. The sensor elements 321 are arranged apart by the ½ width.

In this case, one of the two sensor elements 321 of one set always exists in the usable region 401. Since the position of the sensor chip 302 in a certain region can be decided at a sufficient accuracy by the incremental signal, the sensor element 321 of the two sensor elements 321 of one set, which exists in the usable region 401, can be specified. It is therefore possible to discriminate whether the absolute recording of the region is 1 or 0.

According to the above-described arrangement, since magnetization occurs continuously in the same direction only two times at maximum in any portion, the position detection accuracy becomes high.

Note that the incremental sensor unit and the incremental track have been exemplified here as components that detect the fore and rear positions of the absolute sensor unit. However, the present invention is not limited to this. Any component that detects fore and rear positions at the same period as the absolute track suffices. Any component can be used if it can detect a periodical signal.

Third Example Embodiment

Figure 5A:
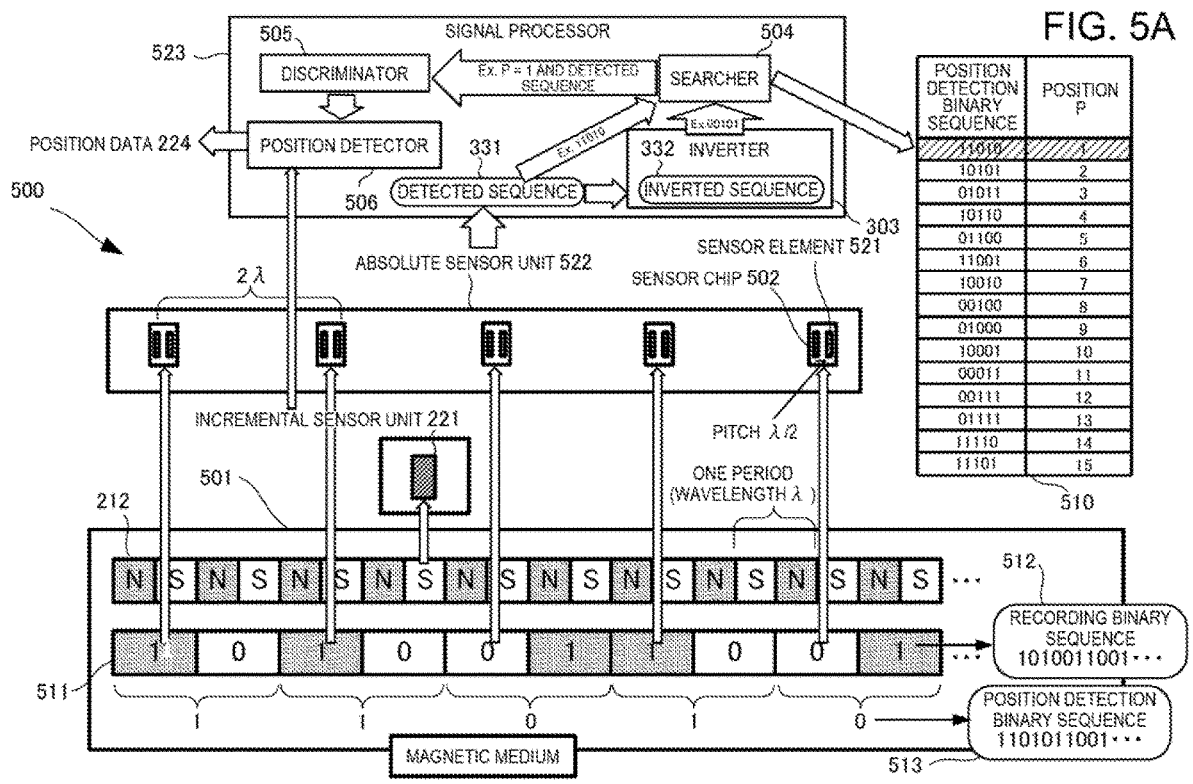
FIG. 5A is a block diagram showing the detailed arrangement of a position detection apparatus according to the third example embodiment.
Figure 5B:
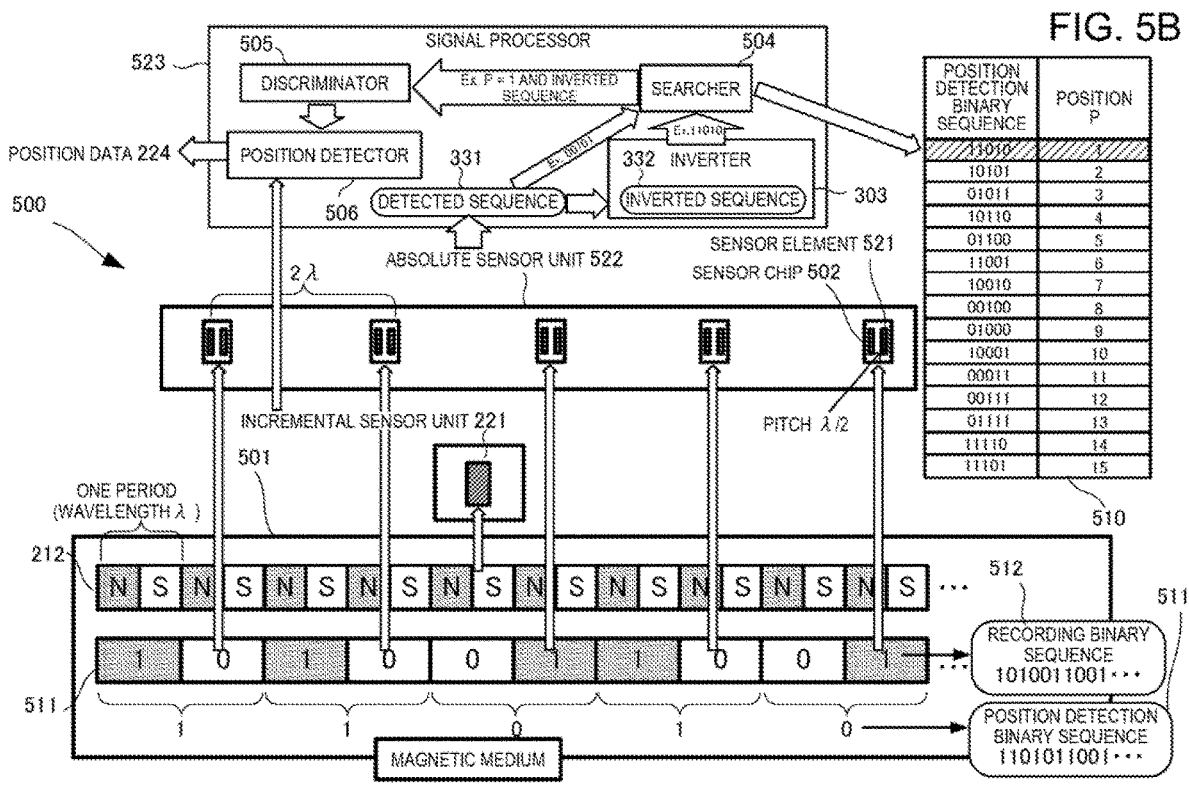
FIG. 5B is a block diagram showing the detailed arrangement of a position detection apparatus according to the fourth example embodiment.

A position detection apparatus 500 according to the third example embodiment will be described next with reference to FIGS. 5A and 5B. FIGS. 5A and 5B are views for explaining the arrangement of the position detection apparatus 500 according to this example embodiment. The position detection apparatus 500 according to this example embodiment is different from the second example embodiment in that the recording density of an absolute track is half, the number of sensor chips of the absolute track is five, and the interval is $2\lambda$. In addition, the components and operation of a signal processor 523 are different. The rest of the components and operations is the same as in the second example embodiment. Hence, the same reference numerals denote the same components and operations, and a detailed description thereof will be omitted.

In an absolute track 511, information corresponding to one bit of a position detection binary sequence 513 is magnetically recorded based on the phase encoding method at two periods of repeating codes of an incremental track 212. The position detection binary sequence 513 is generated by an LFSR including even number of taps.

An absolute sensor unit 522 includes sensor chips 502 that detect the sequence of (N+1) or more terms (here, live terms) every other term from a recording binary sequence. That is, the number of sensor chips 502 equals the number of hits of a code generated by the LFSR and added by 1.

Two sensor elements 521 are arranged in the sensor chip 502 at an interval of $\lambda/2$. If the bit length of the LFSR is N (here, for example, 4), the number of sensor chips 502 is (N+1) or more (here, for example, 5).

When the recording binary sequence is arranged in the absolute track 211, as in the second example embodiment, each magnet become small, and the magnetic force weakens. Hence, the size of each magnet of the absolute track 511 is doubled, as shown in FIGS. 5A and 5B, to record a recording binary sequence 512. That is, one value of the absolute track 511 is recorded in two periods ($2\lambda$) of the incremental track 212. Although the recording density (that is, the resolution) is lower than in the first example embodiment, the accuracy becomes high because of the strong magnetic force.

As the characteristic of a detected sequence 331 and an inverted sequence 332 read by the absolute sensor unit 522, only one of these exists at one point of the whole position detection binary sequence 513 generated by the LFSR. Using this characteristic, the signal processor 523 estimates the recorded position detection binary sequence 513, and decodes the estimated code to position information, thereby determining the relative positions of a magnetic medium 501 and the absolute sensor unit 522.

The signal processor 523 includes an inverter 303, a searcher 504, a discriminator 505, and a position detector 506. Unlike the searcher 305 according to the second example embodiment, the searcher 504 searches the position detection binary sequence for both the detected sequence 331 and the inverted sequence 332.

The searcher 504 notifies the discriminator 505 which one of the detected sequence 331 and the inverted sequence 332 is included at which position of the position detection binary sequence 513. In accordance with the position of the position detection binary sequence 513 at which one of the detected sequence 331 and the inverted sequence 332 is included, the discriminator 505 detects which position in the absolute track 511 the absolute sensor unit 522 faces. That is, the discriminator 505 calculates a rough position. The position detector 506 combines the output of the incremental sensor unit 221 with the position discriminated by the discriminator 505, thereby obtaining the correct position of the absolute sensor unit 522.

Figure 5C:
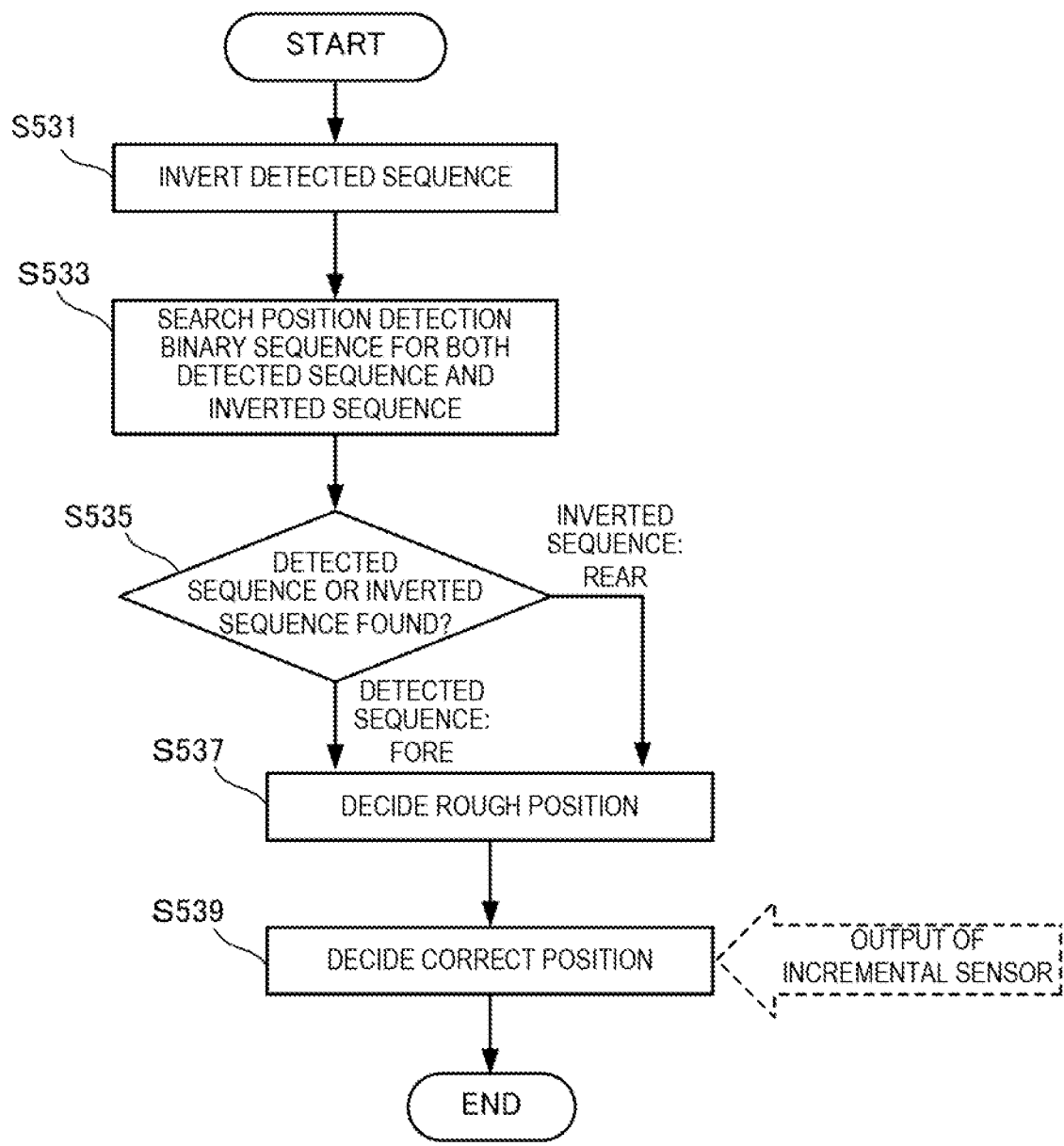
FIG. 5C is a flowchart showing the procedure of processing of the position detection apparatus according to the second example embodiment.

FIG. 5C is a flowchart for explaining the procedure of processing performed by the signal processor 523. In step S531, the inverter 303 inverts the detected sequence 331, thereby generating the inverted sequence 332. Next, in step S533, the searcher 504 searches the position detection binary sequence 513 for the detected sequence 331 and the inverted sequence 332.

Next, in step S535, it is judged whether the sequence detected in the position detection binary sequence 513 is the detected sequence 331 or the inverted sequence 332. In step S537, the discriminator 505 decides the rough position of the absolute sensor unit 522 depending on the position where one of the detected sequence 331 and the inverted sequence 332 is detected in the position detection binary sequence 513 and which one of them is detected.

Also, in step S537, the correct position of the absolute sensor unit 222 is discriminated based on a signal from the incremental sensor unit 221.

The above-described processing procedure is implemented by executing software by a processor. The procedure may be implemented using an ASIC (Application Specific Integrated Circuit) or an FPGA (Field Programmable Gate Array).

This example embodiment uses a characteristic representing that in a sequence generated by the LFSR including an even number of taps, regardless of an extracted partial sequence of (N+1) continuous terms, a sequence obtained by inverting all terms of the partial sequence does not exist in one period of a sequence generated by the same LFSR. That is, the detected sequence 331 and the inverted sequence 332 are never simultaneously included in the position detection binary sequence 513. When which one of the sequences exists in the sequence is judged, it is possible to know which one of a term on the fore side and a term on the rear side is read in the recording binary sequence 312 (that is, two magnets) of two terms corresponding to one term of the position detection binary sequence 513.

As described above, according to this example embodiment, it is possible to make the magnet and the sensor twice larger without changing the resolution.

Note that in this example embodiment, five sensor chips 502 are provided. However, the present invention is not limited to this, and the number of the sensor chips 502 may be six or seven.

Reason Why Only One of Detected Sequence and Inverted Sequence Exists at One Point of Position Detection Binary Sequence Assume that the (N+1) sensor chips 502 are located at positions facing a given position detection binary sequence {b1, b2, . . . , bN, bN+1} (here, 11010). At this time, the detected sequence 331 located in the first half region of $2\lambda$ corresponding to one bit of the position detection binary sequence remains {b1, b2, ..., bN, bN+1} (here 11010), as in the example shown in FIG. 5A. On the other hand, the detected sequence 331 located in the second half region of 2λ is {~b1, ~b2, ..., ~bN, and ~bN+1} (here, the symbol ~ means inversion, and the sequence is 00101 in the example shown in FIG. 5B). A sequence obtained by extracting only tap sequences from {b1, b2, ..., bN} is {t1, t2, ..., tm}.

When the sequence generated by the LFSR circulates at a period of 2 or more, the number of taps is always an even number, and therefore, m is an even number. Considering generation by a Fibonacci LFSR, (bN+1) is the result of calculating the exclusive OR of all terms of {t1, t2, ..., tm}.

Hence, the value of (bN+1) is decided depending on the even or odd of the number of 1s or 0s in {t1, t2, ..., tm}. Similarly, a term generated next to {~b1, ~b2, ..., ~bN} is the result of calculating the exclusive OR of all terms of {~t1, ~t2, ..., ~tm}. Since the even or odd of the number of 1s or 0s matches between {t1, t2, ..., tm} and {~t1, ~t2, ..., ~tm}, the term next to {~b1, ~b2, ..., ~bN} is bN+1.

Hence, {~b1, ~b2, ..., ~bN, bN+1} exists in the position detection binary sequence. At this tune, since {~b1, ~b2, ..., ~bN} exists only at one point in the whole sequence, {~b1, ~b2, ..., ~bN+1} does not exist. Thus, if {~b1, ~b2, ..., ~bN, bN+1} exists in all sequences generated by the N-bit LFSR, {~b1, ~b2, ..., ~bN, ~bN+1} does not exist. That is, only one of the detected sequence and the inverted sequence exists at one point in the position detection binary sequence.

The searcher 504 searches for the appearance order of the detected sequence 331 and the inverted sequence 332 in the position detection binary sequence 513. As in the example shown in FIG. 5A, when located in the first half region, an appearance order P (here, P=1) of {b1, b2, ..., bN, bN+1} (here, 11010) that is the detected sequence 331 is obtained, and the appearance order of the inverted sequence 332 is not obtained. Conversely, as in the example shown in FIG. 5B when located in the second half region, the appearance order P (here, P=1) of {b1, b2, ..., bN, bN+1} (here, 11010) that is the inverted sequence 332 is obtained, and the appearance order of the detected sequence is not obtained. Hence, when the appearance order of the detected sequence is obtained, it can be found that the sensor faces the (2P−1)th (here, first) magnet of the absolute track 511. When the appearance order of the inverted sequence is obtained, it can be found that the sensor faces the (2P)th (here, second) magnet of the absolute track 511. In this example embodiment, if the resolution has no problem, the incremental track 212 and the incremental sensor unit 221 are unnecessary. When the incremental track 212 and the incremental sensor unit 221 are used, the resolution can be made twice higher.

In the arrangement according to the third example embodiment, since the magnetization inversion interval is 2 at maximum in the phase encoding method, the labor for fine adjustment can be saved. The margin itself is also larger than NRZ. In addition, since each magnet is large, stability is high. The arrangement according to the second example embodiment and the arrangement according to the third example embodiment are preferably selectively used in accordance with the sensitivity of a sensor to be used and the distance between the sensor and the magnetic medium in use.

Other Example Embodiments

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims. A system or apparatus including any combination of the individual features included in the respective example embodiments may be incorporated in the scope of the present invention.

Particularly, in the above-described example embodiments, a magnetic position detection apparatus (magnetic scale) that detects a position by magnetism has been described. The example embodiments can also be applied to an optical position detection apparatus (laser scale) that detects a position by a laser beam.

The present invention is applicable to a system including a plurality of devices or a single apparatus. The present invention is also applicable even when art information processing program for implementing the functions of example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

What is claimed is:

1. A position detection apparatus comprising:
an absolute track in which a first binary sequence generated from a second binary sequence is recorded; and
an absolute sensor unit that reads the first binary sequence from said absolute track,
wherein the first binary sequence consists of 0s and 1s and is generated by replacing 0 in the second binary sequence with 10 and 1 in the second binary sequence with 01, or by replacing 0 in the second binary sequence with 01 and 1 in the second binary sequence with 10,
wherein when reading, values in the second binary sequence are replaced with 1s and 0s in accordance with not a positive/negative of magnetism but a direction of inversion from positive to negative or from negative to positive, and
wherein said absolute sensor unit includes two sensor elements arranged at an interval of $\lambda/2$ or less than $\lambda/2$ of a recording pitch $\lambda$ of the first binary sequence,
the apparatus further comprising:
an incremental track communicating with an incremental sensor unit that detects fore and rear positions of the absolute sensor unit;
an inverter that generates an inverted sequence by bit-inverting a detected sequence detected by said absolute sensor unit;
a discriminator that discriminates, based on the fore and rear positions detected by the incremental sensor unit, which one of the detected sequence and the inverted sequence should be searched for;
a searcher that searches the second binary sequence for the detected sequence or the inverted sequence discriminated by the discriminator; and
a position detector that detects a position of said absolute sensor unit based on a position of the detected sequence or the inverted sequence found by said searcher in the second binary sequence and the fore and rear positions detected by the incremental sensor unit.

2. The apparatus according to claim 1, wherein said absolute sensor unit includes a sensor that senses a sequence of at least (N+1) terms by measuring every other term from the first binary sequence.

3. The apparatus according to claim 1, wherein the discriminator discriminates, based on whether the detected sequence or the inverted sequence is found by said searcher, which one of the two values of the first binary sequence, which is replaced from one value of the second binary sequence, is detected by said absolute sensor unit.

4. A position detection apparatus according to claim 1, comprising:
an absolute track in which a first binary sequence generated from a second binary sequence is recorded; and
an absolute sensor unit that reads the first binary sequence from said absolute track,
wherein the first binary sequence consists of 0s and 1s and is generated by replacing 0 in the second binary sequence with 10 and 1 in the second binary sequence with 01, or by replacing 0 in the second binary sequence with 01 and 1 in the second binary sequence with 10,
wherein when reading, values in the second binary sequence are replaced with 1s and 0s in accordance with not a positive/negative of magnetism but a direction of inversion from positive to negative or from negative to positive,
wherein said absolute sensor unit includes two sensor elements arranged at an interval of $\lambda/2$ or less than $\lambda/2$ of a recording pitch $\lambda$, of the first binary sequence, and
wherein said absolute sensor unit detects every other term of a sequence of at least N terms from the first binary sequence, and
the apparatus further comprises:
an incremental track communicating with an incremental sensor unit operating as a fore and rear detector that detects which one of the two values of the first binary sequence corresponds to the position that said absolute sensor unit faces;
an inverter that generates an inverted sequence by bit-inverting a detected sequence detected by said absolute sensor unit;
a discriminator that discriminates, based on fore and rear positions detected by the fore and rear detector, which one of the detected sequence and the inverted sequence should be searched for;
a searcher that searches the second binary sequence for the detected sequence or the inverted sequence discriminated by the discriminator; and
a position detector that converts, based on a correspondence relationship between the first binary sequence and the second binary sequence, the sequence detected by said absolute sensor unit, and detects a position of said absolute sensor unit based on the position of the detected sequence or the inverted sequence found by said searcher in the second binary sequence after the conversion and the fore and rear positions detected by said fore and rear detector.

5. A position detection method comprising:
recording, in an absolute track, a first binary sequence generated from a second binary sequence; and
reading, by an absolute sensor unit, the first binary sequence from said absolute track,
wherein the first binary sequence consists of 0s and 1s and is generated by replacing 0 in the second binary sequence with 10 and 1 in the second binary sequence with 01, or by replacing 0 in the second binary sequence with 01 and 1 in the second binary sequence with 10,
wherein when reading, values in the second binary sequence are replaced with 1s and 0s in accordance with not a positive/negative of magnetism but a direction of inversion from positive to negative or from negative to positive, and
wherein said absolute sensor unit includes two sensor elements arranged at an interval of $\lambda/2$ or less than $\lambda/2$ of a recording pitch $\lambda$ of the first binary sequence,
the method further comprising:
communicating, by an incremental track, with an incremental sensor unit that detects fore and rear positions of the absolute sensor unit;
generating, by an inverter, an inverted sequence by bit-inverting a detected sequence detected by said absolute sensor unit;
discriminating, by a discriminator, based on the fore and rear positions detected by the incremental sensor unit, which one of the detected sequence and the inverted sequence should be searched for;
searching, by a searcher, the second binary sequence for the detected sequence or the inverted sequence discriminated by the discriminator; and
detecting, by a position detector, a position of said absolute sensor unit based on a position of the detected sequence or the inverted sequence found by said searcher in the second binary sequence and the fore and rear positions detected by the incremental sensor unit.

6. The method according to claim 5, further comprising discriminating, by the discriminator, based on whether the detected sequence or the inverted sequence is found by said searcher, which one of the two values of the first binary sequence, which is replaced from one value of the second binary sequence, is detected by said absolute sensor unit.

* * * * *